April 20, 1926. 1,581,748
J. A. LUND
CHAIN FASTENER AND LOCK
Filed Feb. 14, 1925
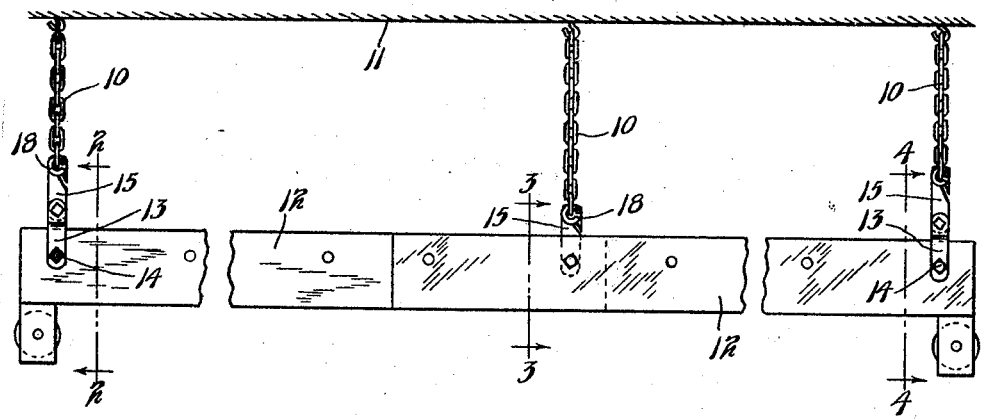
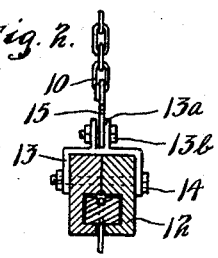
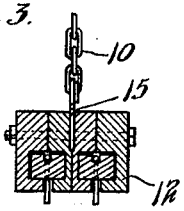
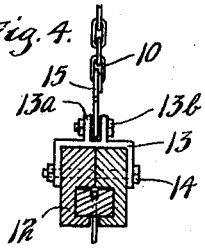
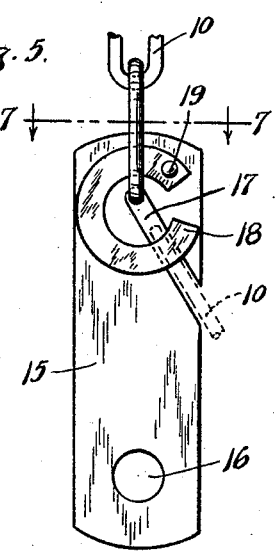
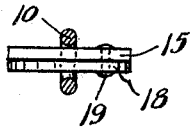
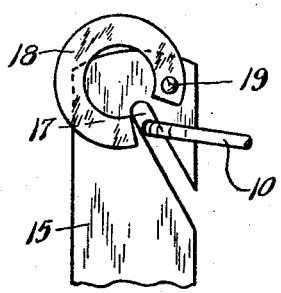
INVENTOR.
JOHN AXEL LUND.
BY HIS ATTORNEYS.

Patented Apr. 20, 1926.

1,581,748

UNITED STATES PATENT OFFICE.

JOHN AXEL LUND, OF MINNEAPOLIS, MINNESOTA, ASSIGNOR TO TWIN CITY SCENIC COMPANY, OF MINNEAPOLIS, MINNESOTA, A CORPORATION OF MINNESOTA.

CHAIN FASTENER AND LOCK.

Application filed February 14, 1925. Serial No. 9,148.

*To all whom it may concern:*

Be it known that I, JOHN AXEL LUND, citizen of Finland, residing at Minneapolis, in the county of Hennepin and State of Minnesota, have invented certain new and useful Improvements in Chain Fasteners and Locks; and I do hereby declare the following to be a full, clear, and exact description of the invention, such as will enable others skilled in the art to which it appertains to make and use the same.

This invention has for its object to provide an extremely simple but highly efficient device for readily connecting and locking the links of chains or other apertured members with objects desired to be removably secured thereto.

While the invention is especially adapted for use in removably connecting desired objects with vertically depending chains or apertured members, it is, of course, capable of wide general usage as will be clearly seen from the following description.

It is a further object in such a device to provide a plate having a hook formed in its upper end and a substantially annular keeper or guard pivoted to said hooked portion and having an open portion therein, through which the ring of a chain or other apertured member may be inserted or withdrawn. This broken or open annular member is preferably pivoted at one of its ends to the hook portion of said plate at a point adjacent the inner end or engagement point of said hook.

It is an additional object of the invention to provide a chain fastener and lock which may quickly be removed or engaged in the link of a chain or other similar member.

A still further object of the invention is to provide such a device especially adapted for engaging the links of a vertically disposed chain, the guard or keeper for which will be held by gravity in proper locked position and will positively prevent disengagement from the chain when, for some reason, the chain is slackened or moved.

The invention is especially applicable for detachably securing theatrical drops and curtain supporting apparatus to a plurality of depending chains secured at their upper ends to some fixed member.

These and other objects of the invention will be apparent from the following description made in connection with the accompanying drawings, wherein like characters refer to similar parts throughout the several views, and in which, Fig. 1 is a front elevation of the rails or guides for draw curtains such as are used in theatres and stages, supported from a plurality of depending chains and removably connected thereto by means of several of the novel chain fasteners and hooks;

Fig. 2 is a vertical cross section taken on the line 2—2 of Fig. 1;

Fig. 3 is a similar view taken on the line 3—3 of Fig. 1;

Fig. 4 is a similar cross section taken on the line 4—4 of Fig. 1;

Fig. 5 is a front elevation of the preferred form of the invention on an enlarged scale secured to a link of a vertically disposed chain with the moved position of said chain being indicated in dotted lines;

Fig. 6 is a similar view showing the position of the pivoted keeper for removal or disengagement of the chain;

Fig. 7 is a horizontal cross section taken on the line 7—7 of Fig. 5.

In Figs. 1 to 4, inclusive, the preferred form of the invention is illustrated in use with a plurality of vertically supported chains 10 supported from a ceiling or beam 11. A pair of curtain guides or rails 12, secured together at their overlapped ends, are removably secured to chains 10 by means of a plurality of the novel chain fasteners. At the ends of rails 12 substantially U-shaped straps 13 are secured by means of transverse bolts 14 having on their upper sides a pair of spaced apertured ears 13ª, through which bolts 13ᵇ are passed to secure the lower ends of the locking devices thereto.

The preferred form of the invention, as illustrated, comprises a substantially rectangular plate 15, having the aperture 16 therethrough adjacent its lower end and having in its upper portion the diagonal channel 17 communicating with one edge of the plate 15 and extending upwardly and diagonally to a point adjacent the upper part of plate 15 and approximately in the longitudinal center thereof.

A guard or keeper 18, preferably of arcuate or broken annular form, is pivoted at one end thereof to the plate 15 at a point on the hook portion of said plate between the inner end of channel 17 and the side of said plate with which said channel communicates. In normal position, the guard 18 is circumscribed about the inner end of channel 17 and the portion of the chain 10 engaged, the channel 17 extending substantially in alinement with the diameter of said guard. Preferably the keeper 18 is loosely pivoted to one side of plate 15 by means of the rivet 19, and, as illustrated in Fig. 5, the open portion of said keeper is disposed at one side of channel 17 adjacent the side of plate 15 with which said channel communicates. Thus said keeper traverses an intermediate portion of channel 17 when in locked position, and also affords portions or arms extending at either side of said channel. If the chain 10 becomes slack or is jarred and the link is pushed to one side of the hook portion, as illustrated by the dotted lines in Fig. 5, keeper 18 will, of course, not be displaced but will be held by gravity across the channel 17, thus securely locking the engaged link of the chain therein. The more the plate 15 is tilted to the right in Fig. 5, the more will keeper 18 be swung simultaneously disposing a greater portion of itself on the hook side of said plate. The force supplied from a slackened chain slipping down at the side of plate 15 will be approximately in a line on a diameter of the annular keeper.

The link of a chain or other apertured member may be readily engaged and locked within the inner end of channel 17 and the keeper 18 will be automatically cammed outwardly when the link is pushed upwardly towards the end of said channel, keeper 18 swinging again downwardly to surround the engaged portion of said link.

To disengage the chain the keeper 18 may be readily swung upwardly and the link of the chain pulled downwardly and out of the hook portion of plate 15.

The novel fastener and locking device may obviously be used on horizontal or cross chains for all purposes where it is desired to employ a readily engageable chain fastener and lock. Gravity will always keep the keeper in proper locked position after the link of the chain or other member has been fastened therein.

The aperture 16 in the lower portion of the plate 15 permits the device to be readily connected to a desired member by transverse bolt or any other suitable connecting means. In Fig. 3 the bolt 14 passes through the rails 12 and also through said aperture 16, in this manner securing plate 15 to said rail.

From the above description, it will be seen that an extremely simple fastening and locking device has been invented, comprising only two parts and capable of being manufactured at little expense. The device has been put to extensive actual usage and has been found highly efficient for the purposes above enumerated.

It will, of course, be understood that various changes may be made in the form, proportions, details and arrangement of parts, as well as the particular shape of the keeper, without departing from the scope of the invention.

What is claimed is:

1. A chain fastener and lock comprising a plate provided with a diagonal channel communicating with one edge of said plate, and an arcuate keeper pivoted adjacent one of its ends to said plate at a point adjacent the inner end of said channel, and adapted to normally traverse an intermediate portion of said channel and extend at either side of the inner end thereof.

2. A chain fastener and lock comprising a substantially rectangular plate having means adjacent one end thereof for securing a member thereto, and having a diagonal channel adjacent its other end and communicating with one edge of said plate, and a substantially annular keeper having an open portion therein pivoted adjacent one of its ends to said plate at a point adjacent the closed end of said channel and normally extending over and across said channel and at the sides thereof with its open portion disposed at one side of said channel.

3. A chain fastener and lock for vertically depending chains comprising a member carrying a hook at the upper end thereof, adapted to engage a link of a chain, and a loosely pivoted keeper of broken annular form pivoted to said hook and adapted to be held by gravity across the open portion thereof extending at the sides of the engaged link of said chain.

4. A chain fastener and lock comprising a substantially rectangular plate having a diagonal slot cut therein at one end adapted to receive a link of a chain or other similar object, and a keeper of broken annular form pivoted at one end to said plate adjacent said slot and normally adapted to be held by gravity across the open portion of said slot at the sides of the engaged link to prevent removal of the link.

In testimony whereof I affix my signature.

JOHN AXEL LUND.